RADIO TRANSMITTING SYSTEM

Filed April 9, 1947 2 Sheets-Sheet 1

INVENTOR.
L. W. FRANKLIN
BY E. R. Evans
his attorney

INVENTOR.
L. W. FRANKLIN
BY E. Q. Evans
his attorney

Patented Jan. 3, 1950

2,493,484

UNITED STATES PATENT OFFICE 2,493,484

RADIO TRANSMITTING SYSTEM

Laurence W. Franklin, Hasbrouck Heights, N. J.

Application April 9, 1947, Serial No. 740,414

11 Claims. (Cl. 332—38)

This invention relates to radio transmitting systems, and more particularly to radiotelephone systems and apparatus employing amplitude modulation.

In radiotelephone communication, the advantages of high average modulation are generally recognized. When the average modulation is increased above about 30 per cent, however, the voice peaks are above 100 per cent, resulting in distortion and so-called side-band "splatter" on adjacent channels. Volume compression and other expedients have been employed to reduce "splatter," notably speech clipping in the audio amplifier. However these methods are relatively complicated, cause undesirable distortion of the signal wave and are not entirely satisfactory in practice.

An object of the present invention is to provide an improved system for modulating a radio frequency carrier in radiotelephone communication, whereby the efficiency or effective range of the transmitter is increased without objectionable distortion or "splatter."

Another object of the invention is to provide a novel and effective system or arrangement for preventing negative peak overmodulation, thus reducing "splatter" and distortion which normally accompany higher modulation. In this manner the range of a transmitting station may be increased without increasing the power of the radio-frequency carrier. The distortion produced by eliminating or reversing the negative peaks in a system according to the invention is not objectionable because the consonant sounds which contribute the most to intelligibility and naturalness of speech are of little power and are not affected; and the overmodulation peak control is accomplished at or near the final transmitter stage which minimizes distortion of the signal wave.

A still further object of the invention is to provide an improved system of the character described in which negative peak modulation of the carrier is controlled under all conditions without affecting positive modulation, the terms "positive" and "negative" referring to the instantaneous values of the modulating signal wave with reference to the associated power source connected to the modulator stage of the transmitter.

Other objects and advantages of the invention will appear from the following description of the preferred embodiments thereof shown in the accompanying drawings, wherein Fig. 1 is a diagrammatic view of an amplitude-modulated radio transmitting system embodying the invention;

Figure 1:
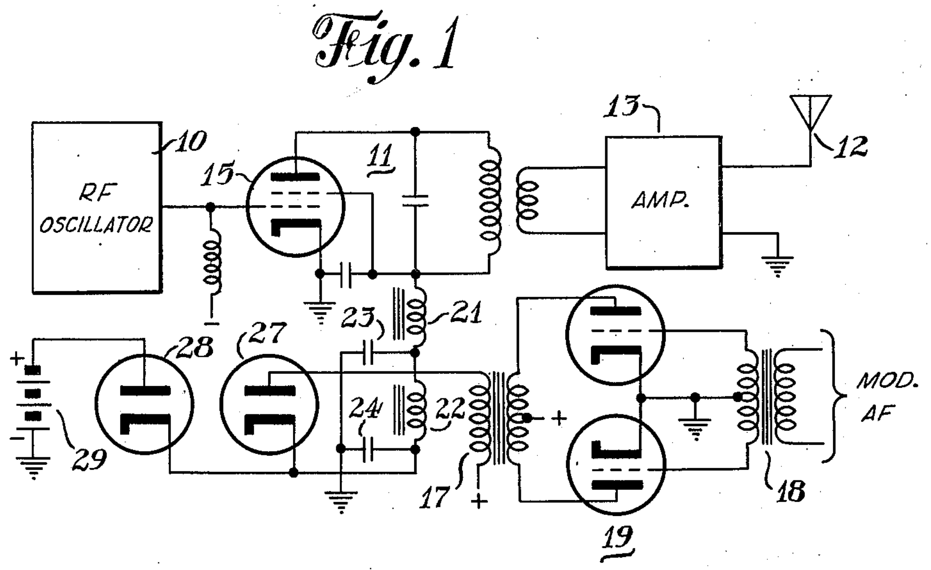

Referring to Fig. 1, the transmitting system shown comprises a radio-frequency oscillator 10 connected to a class C modulating stage 11, the output circuit of which is connected in the usual manner to an antenna 12. An amplifier 13 may be interposed if desired between the modulating stage 11 and the antenna but frequently it is preferred to connect the modulating stage directly to the antenna. As shown by way of example, the modulating stage 11 comprises a screen-grid tube 15 arranged for plate modulation of the radio-frequency carrier. The plate potential for tube 15 is supplied from a positive battery or other source through the secondary winding of the modulation transformer 17. The modulating audio-frequency source is connected through a coupling transformer 18, and amplifier 19 to the primary winding of transformer 17, and thus varies the plate potential of the modulating tube 15 in response to the audio-frequency variations of said source. A low-pass filter consisting of series chokes 21 and 22, and shunt capacitors 23 and 24 may be connected at the input to the stage 11 if desired.

Figure 2:
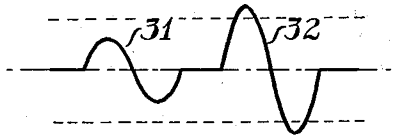
Figs. 2 and 3 are graphs illustrating the characteristics of the system shown in Fig. 1.

In accordance with the present invention, the output of the audio-frequency stage, represented in this case by the transformer 17, is connected to the modulating stage through a first half-wave rectifier 27. A second rectifier 28 is connected in a shunt path to ground through a biasing battery or other source of potential 29 of, say, 10 per cent of the potential of the plate supply of the modulating tube 15. The positive pole of the battery 29 is connected to the anode of rectifier 28, and the cathodes of both rectifiers are connected to the plate circuit of modulating tube 15, as indicated. With this arrangement, it will be evident that as long as the rectifier 27 is conducting and the rectifier 28 is non-conducting, the operation is the same as any similar plate-modulated radio-frequency system, and this condition obtains so long as the negative peak modulation does not exceed 90 per cent of the carrier. Thus, as shown in Figs. 2 and 3, a low-amplitude audio-frequency signal wave 31 not exceeding a predetermined magnitude modulates the carrier wave as represented by the curve 33.

However, when the negative peak of the audio wave exceeds 90 per cent of the amplitude of the carrier, the unilateral conducting elements 27 and 28 cut off the carrier swing, the former becoming non-conductive and the rectifier 28 commencing to pass current from the positive source 29. Thus as shown in Figs. 2 and 3, the high-amplitude signal 32 modulates the carrier wave as represented by the curve 34. The positive swing of the carrier is not affected but the negative swing is limited as indicated at 35. If the potential of the source 29 is as stated, the negative peak modulation cannot exceed 90 per cent of the carrier amplitude, and it is obvious that by varying the potential of the source 29 the negative modulation peaks can be controlled as desired without affecting the positive peaks, and in any event cannot exceed 100 per cent.

Figures 3, 4:
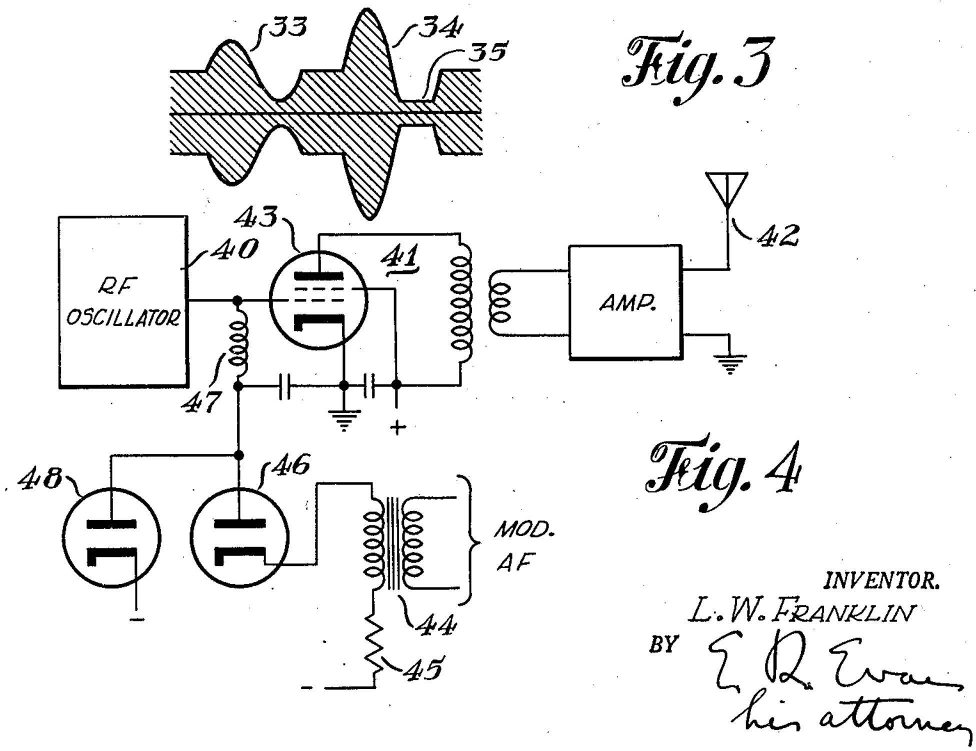
Figs. 4 and 5 are views similar to Fig. 1 showing modifications of the invention.

Fig. 4 illustrates another embodiment of the invention in which a radio-frequency oscillator 40 is shown as connected to a grid-modulation stage 41, which in turn is connected to the antenna 42 as in the system shown in Fig. 1. The control of the negative peak modulation is essentially the same as in the first embodiment of the invention, except that it is accomplished by limiting the negative swing of the grid in a grid (or suppressor) modulating stage. The modulating audio-frequency source is connected to the primary of transformer 44. The negative grid potential source for modulating tube 43 is connected through a resistor 45, the secondary winding of transformer 44, a rectifier 46 and a radio-frequency choke 47 to the grid of said tube. The shunt rectifier 48 connected to a negative source of predetermined magnitude prevents the modulating signal wave from swinging the potential of the grid of tube 42 more negative than a desired value, and thus positively controls negative peak modulation on signals sufficiently strong to cause overmodulation. For example, if the grid source has a potential of minus 100 volts, the source connected to rectifier 48 might have a value of minus 200 volts. Since the grid swing is limited to minus 200 volts, any excess modulating potential will appear across the resistor 45. By correlating the control potential to the bias potential of the modulating stage, the negative peak modulation may be controlled to the same extent as in the system shown in Fig. 1.

Figure 5:
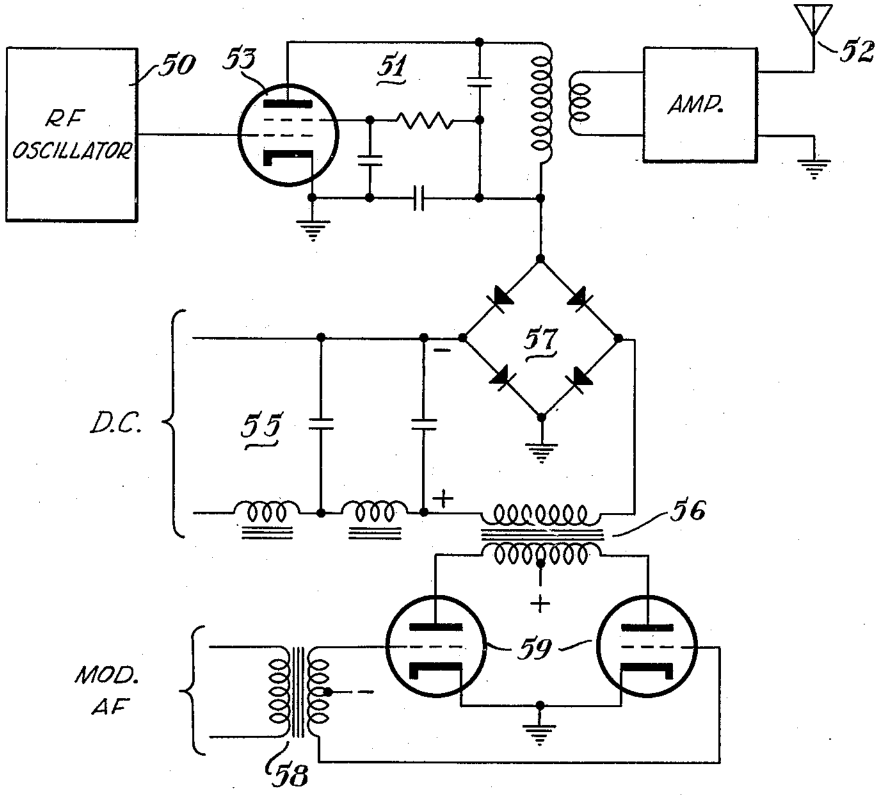
Figure 6:
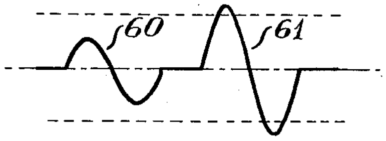
Figs. 6 and 7 are graphs illustrating the characteristics of the system shown in Fig. 5.
Figure 7:
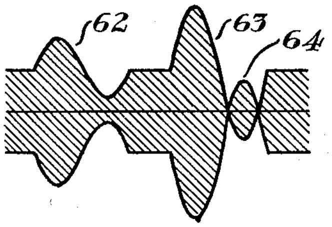

Fig. 5 illustrates another modification of the invention in which overmodulation on the negative peaks is prevented by limiting the negative swing of the modulating potential to 100 per cent of the carrier. As shown by way of example, a radio-frequency oscillator 50 is connected through a conventional modulating stage 51 to an antenna 52 in substantially the same manner as in the system shown in Fig. 1. The plate circuit of modulating tube 53 is supplied with power through a choke-input filter 55, the circuit including the secondary winding of a modulation transformer 56 and a full-wave rectifier 57. The modulating audio-frequency source is connected through a coupling transformer 58 and amplifier 59 to the primary winding of transformer 56. By reason of the connection of the rectifier 57, as shown, it will be evident that excessively high peak values of the modulating potential cannot drive the plate of modulating tube 53 negative, as any negative potential produced by over 100 per cent negative modulation is reversed in polarity by rectifier 57. For a modulating signal wave below a predetermined value, as represented by the curve 60 in Fig. 6, the modulation of the carrier is represented by the curve 62 in Fig. 7. The curve 61 represents a high-amplitude modulating wave and, as shown at 63, the positive peak of the carrier is not affected. However on the negative peak, as shown at 64, when the modulating signal exceeds 100 per cent, the rectifier 57 causes a carrier pulse to be generated; thus the carrier is only reduced to zero for an instant and the "splatter" normally resulting from negative peak overmodulation is prevented.

While the systems shown in Figs. 1 and 5 are illustrated as applied to plate-modulated class C amplifiers, as commonly used, it is obvious that these systems may be applied to the Heising or constant-current system, or to any system in which a normally positive element is modulated. Similarly, the arrangement of Fig. 4 may obviously be used with any system in which a normally negative element is modulated.

It will be apparent that in accordance with the invention, a system is provided for preventing overmodulation of a carrier on negative peaks in a simple and effective manner. Since the improved control is applied at the point where the modulating voltage is applied to the modulating stage, it can be readily incorporated in standard circuits or added to an existing transmitter installation. Since the carrier is never reduced to zero for an appreciable period, a broad signal or side-band "splatter" does not result when the average modulation of the transmitter is increased. Thus higher modulation can be used and the range of the transmitting station can be increased considerably without increasing the power of the carrier. Furthermore since the peak control is effected only on negative peaks and at or near the final stage of the transmitter, distortion of the signal wave is negligible under ordinary operating conditions, even when the average modulation level is relatively high. Furthermore the point of carrier swing limiting may be quickly and accurately adjusted to any desired potential by using only a D. C. voltmeter. Thus in Fig. 1, if the plate potential of stage 15 is 2000 volts, a source 29 of 200 volts will permit exactly 90 per cent negative modulation; or a source 29 of 40 volts will permit 98 per cent modulation, leaving a "residual carrier" of 10 per cent or 2 per cent, respectively.

While several modifications of the invention have been described in detail for the purpose of explaining the theory and principles involved, other modifications will occur to those skilled in the art and may be made without departing from the scope of the invention as defined in the appended claims.

I claim:

1. A radio transmitting system comprising a source of carrier current, a modulating stage connected thereto, a power supply for said stage, means for impressing a modulating signal wave on said modulating stage and means including a rectifier connected to said means and said power supply for preventing carrier cut-off on negative modulation peaks exceeding the voltage of the power supply.

2. A radio transmitting system comprising a source of carrier current, a modulating stage connected thereto, a power supply for said stage, means for impressing a modulating signal wave on said modulating stage and rectifier means in series with said power supply to said modulating stage for preventing carrier cut-off on negative modulation peaks exceeding the voltage of said power supply.

3. A radio transmitting system comprising a source of carrier current, a modulating stage connected thereto and including an electric discharge tube provided with cathode, grid and plate electrodes, a source of audio-frequency current, a connection between said last-mentioned source and the plate electrode of said tube to effect plate modulation of the carrier, and limiting means in said connection for controlling the supply of potential to said plate electrode at the higher peak values of the modulating potential from said modulated audio-frequency source, said limiting means including a half-wave rectifier in series relation with said audio-frequency current source and said modulating stage, said rectifier comprising an anode and a cathode and being poled to pass positive potential normally to said modulating stage, said limiting means further comprising a second half-wave rectifier and a source of positive potential in shunt relation to said first-mentioned rectifier, said second rectifier comprising a cathode connected to the cathode of the first-mentioned rectifier and an anode connected to said last-mentioned source of positive potential.

4. A radio transmitting system comprising a source of carrier current, a modulating stage connected thereto and including an electric discharge tube provided with grid and plate electrodes, a source of audio-frequency current, a connection between said last-mentioned source and one of the electrodes of said tube to effect modulation of the carrier, a rectifier in series relation with said connection and means including said rectifier for controlling said one of the electrodes whenever the potential of said modulating source exceeds a predetermined value to prevent carrier cut-off on negative modulation peaks exceeding the voltage normally supplied to said one of the electrodes.

5. A radio transmitting system comprising a source of carrier current, a modulating stage connected thereto and including an electric discharge tube provided with grid and plate electrodes, a source of audio-frequency current, a direct-current source, said audio-frequency source and direct-current source being connected in series relation with one of the electrodes of said tube and means including a rectifier for maintaining the said one of the electrodes of the same polarity irrespective of the variations in amplitude of said audio-frequency source.

6. A radio transmitting system comprising a source of carrier current, a modulating stage connected thereto and including an electric discharge tube provided with grid and plate electrodes, sources of power and modulating potentials for one of said electrodes, and a full-wave rectifier so connected to said sources and said one of the electrodes that the polarity of the latter is maintained the same irrespective of the relative magnitudes of the potentials from said sources.

7. A radio transmitting system comprising an amplitude-modulating stage including a modulating electrode, direct-current and modulating-current sources connected to said electrode and means in circuit with said electrode for preventing carrier cut-off on negative modulation peaks exceeding the voltage of said direct-current source on the positive peaks.

8. A radio transmitting system comprising an amplitude-modulating stage including a modulating electrode, a source of modulating current connected to said electrode, said source being arranged to vary the potential thereof under normal modulating conditions, and means to supply a steady state potential to said electrode when the modulation level increases beyond a predetermined point in a direction to cause carrier cut-off.

9. A radio transmitting system comprising a carrier source, a plate-modulating stage, a source of modulating current connected to said stage, said source of modulating current being arranged to vary the plate potential thereof, and means to supply a steady positive potential to said plate when the modulation level increases beyond a predetermined point in a direction to cause carrier cut-off.

10. A radio transmitting system comprising a source of carrier current, a class C modulating stage having its grid connected to said source, a source of modulating audio-frequency current connected to said modulating stage, a direct-current power source in series relation with said modulating current source and said modulating stage, and means including a rectifier also in series relation with said modulating current source and said modulating stage to prevent carrier cut-off on negative modulation peaks exceeding the voltage of said power source.

11. A radio transmitting system comprising a source of carrier current, a class C modulating stage having its grid connected to said source, a source of modulating audio-frequency current connected to said modulating stage, a direct-current power source in series relation with said modulating current source and said modulating stage, and means including a first rectifier also in series relation with said modulating current source and said modulating stage and a second rectifier in shunt relation to said first rectifier to prevent negative peak over-modulation of said carrier, said means also including a source of positive potential connected to said second rectifier to prevent reduction of the carrier amplitude to zero on negative modulation peaks.

LAURENCE W. FRANKLIN.

REFERENCES CITED

The following references are of record in the file of this patent:

UNITED STATES PATENTS

| Number | Name | Date |
|---|---|---|
| 1,986,644 | Pfister | Jan. 1, 1935 |
| 2,131,443 | Kummerer et al | Sept. 27, 1938 |
| 2,203,521 | Carnein | June 4, 1940 |
| 2,214,573 | Booth | Sept. 10, 1940 |

FOREIGN PATENTS

| Number | Country | Date |
|---|---|---|
| 421,340 | Great Britain | Dec. 19, 1934 |
| 439,205 | Great Britain | Dec. 2, 1935 |